(12) United States Patent
Takahashi et al.

(10) Patent No.: US 8,213,127 B2
(45) Date of Patent: Jul. 3, 2012

(54) MICROACTUATOR, HEAD GIMBAL ASSEMBLY, AND MAGNETIC DISK DRIVE

(75) Inventors: Haruhide Takahashi, Kanagawa (JP); Toshiki Hirano, San Jose, CA (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 924 days.

(21) Appl. No.: 12/284,252

(22) Filed: Sep. 19, 2008

(65) Prior Publication Data

US 2009/0080116 A1 Mar. 26, 2009

(30) Foreign Application Priority Data

Sep. 19, 2007 (JP) ................................. 2007-243149

(51) Int. Cl.
*G11B 5/56* (2006.01)

(52) U.S. Cl. .................................................... 360/294.4

(58) Field of Classification Search ................ 360/294.4
See application file for complete search history.

(56) References Cited

U.S. PATENT DOCUMENTS

| 6,327,120 | B1 | 12/2001 | Koganezawa et al. | |
| 6,754,047 | B2 * | 6/2004 | Pan et al. | 360/294.4 |
| 6,961,221 | B1 * | 11/2005 | Niu et al. | 360/294.4 |
| 7,068,473 | B2 * | 6/2006 | O'Neill | 360/294.4 |
| 7,277,258 | B2 * | 10/2007 | Hirano et al. | 360/294.3 |
| 7,301,731 | B2 * | 11/2007 | Mita et al. | 360/294.4 |
| 7,382,583 | B2 * | 6/2008 | Hirano et al. | 360/294.4 |
| 2006/0044698 | A1 | 3/2006 | Hirano et al. | |
| 2006/0044699 | A1 | 3/2006 | Hirano et al. | |

* cited by examiner

*Primary Examiner* — Mark Blouin

(57) ABSTRACT

Embodiments of the present invention help to suppress reduction of the operation quantity of a microactuator. According to one embodiment, a microactuator comprises a silicon substrate and a piezoelectric element. The silicon substrate has some rigidity and provides elastic counter force to the piezoelectric element. In the piezoelectric element, a secondary piezoelectric layer is laminated on a primary piezoelectric layer opposite from the silicon substrate. The contraction force of the secondary piezoelectric layer acts on the primary piezoelectric layer so that it bends toward the secondary piezoelectric layer opposite from the silicon substrate. When the primary piezoelectric layer expands, the contraction force of the secondary piezoelectric layer acts on the primary piezoelectric layer so that it warps against the primary piezoelectric layer.

12 Claims, 11 Drawing Sheets

MICROACTUATOR, HEAD GIMBAL ASSEMBLY, AND MAGNETIC DISK DRIVE

CROSS-REFERENCE TO RELATED APPLICATION

The instant nonprovisional patent application claims priority from Japanese Patent Application No. 2007-243149 filed Sep. 19, 2007 and which is incorporated by reference in its entirety herein for all purposes

BACKGROUND OF THE INVENTION

Disk drive devices using various kinds of recording disks, such as optical disks, magneto-optical disks, flexible magnetic disks, and the like, have been known in the art. In particular, hard disk drives (HDDs) have been widely used as storage devices of computers and have been one of indispensable storage devices for current computer systems. Moreover, the HDDs have found widespread application to moving image recording/reproducing apparatuses, car navigation systems, cellular phones, and the like, due to their outstanding characteristics.

A magnetic disk used in an HDD has multiple concentric data tracks; each data track records multiple servo data having address information and multiple data sectors containing user data thereon A head element portion accesses a desired data sector in accordance with address information in the servo data to write data to and retrieve data from the data sector.

The head element portion is formed on a slider; the slider is bonded to a suspension of an actuator. The assembly of the actuator and the head slider is called a head stack assembly (HSA) and the assembly of the suspension and the head slider is called a head gimbal assembly (HGA).

Pressure caused by air viscosity between the air bearing surface (ABS) of the slider facing the magnetic disk and a spinning magnetic disk balances pressure toward the magnetic disk added by the suspension so that the head slider flies over the magnetic disk with a specific gap. The actuator pivots about a pivotal shaft to move the head slider to a target track and position it onto the track.

As the track per inch (TPI) in the magnetic disk increases, improvement in positioning accuracy of a head slider is required. However, it is getting more difficult to improve the positioning accuracy in driving an actuator by a voice coil motor (VCM). Therefore, an approach has been proposed that mounts a compact actuator (microactuator) on a tip end of the actuator to achieve a finer positioning (for example, refer to U.S. Patent Publication No. 2006/0044698 "Patent Document 1").

The microactuator in Patent Document 1 has a piezoelectric element fixed onto the end of a substrate. The head slider is bonded to around the center of the substrate surface. As the piezoelectric element expands or contracts in an in-plane direction, beams having spring properties formed on the substrate are finely displaced in the in-plane direction to rotate the head slider. This achieves a highly accurate positioning of the head element portion to a desired position.

For highly accurate positioning control by the microactuator in a sufficient range, it is important to increase the expansion and contraction stroke of the piezoelectric element. Since the piezoelectric element expands or contracts in response to application of a voltage, increasing the voltage applied to the piezoelectric element results in increasing the stroke. However, the source voltage applied to an HDD from the external is a preset constant voltage of approximately 12 V. Mounting a booster circuit on the HDD leads to raising a supply voltage from the external to apply a higher voltage to the piezoelectric element. However, in order to achieve a simpler circuit configuration and a less expensive cost, it is preferable not to employ such an additional circuit.

Consequently, it is desired to increase the expansion and contraction stroke as much as possible within a limited voltage range by the structure of the piezoelectric element without employing an additional circuit. Various structures have been proposed for a piezoelectric element as in the following documents and others.

Figure 11:
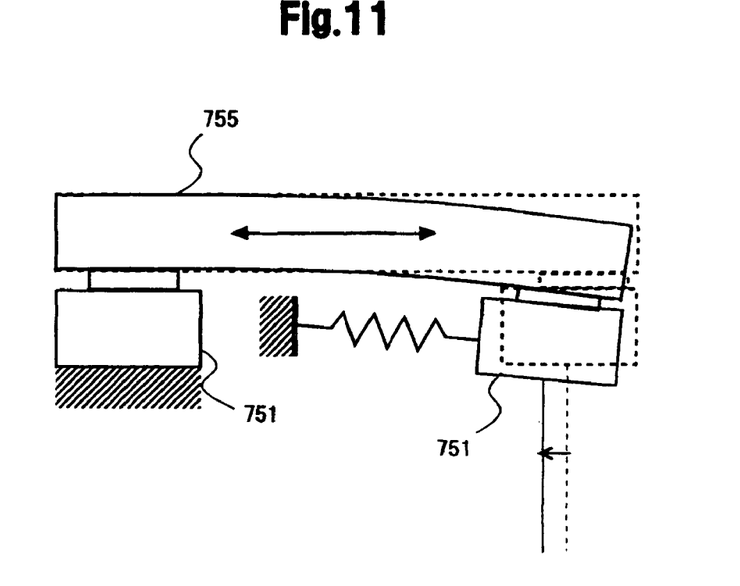
FIG. 11 is an exemplary cross-sectional view schematically illustrating operation of a microactuator according to a conventional technique.

However, the inventors have found that a microactuator with a piezoelectric element has a problem that elastic deformation of the substrate influences the expansion and contraction stroke of the piezoelectric element (displacement amount in the in-plane direction) to decrease it. FIG. 11 schematically illustrates the expansion and contraction and the deformation of a piezoelectric element 755 bonded onto a substrate 751. FIG. 11 is a conceptual drawing and does not reflect the actual dimensions.

Since the substrate 751 has some rigidity, it has elastic force. For example, if the piezoelectric element 755 expands as shown in FIG. 11, the piezoelectric element 755 tilts toward the substrate 751 due to the elastic force of the substrate 751. This tilt causes decrease in the expansion and contraction stroke of the piezoelectric element 755 by 40%. In order to increase the expansion and contraction stroke as much as possible within a limited voltage range, this decrease in the stroke due to the tilt becomes a big loss, which should be prevented.

BRIEF SUMMARY OF THE INVENTION

Embodiments of the present invention help to suppress reduction of the operation quantity of a microactuator. According to the embodiment of FIGS. 7(a)-7(c), a microactuator 205 comprises a silicon substrate 251 and a piezoelectric element 255. The silicon substrate 251 has some rigidity and provides elastic counter force to the piezoelectric element 255. In the piezoelectric element 255, a secondary piezoelectric layer 62 is laminated on a primary piezoelectric layer 61 opposite from the silicon substrate 251. The contraction force of the secondary piezoelectric layer 62 acts on the primary piezoelectric layer 61 so that it bends toward the secondary piezoelectric layer 62 opposite from the silicon substrate 251. When the primary piezoelectric layer 61 expands, the contraction force of the secondary piezoelectric layer 62 acts on the primary piezoelectric layer 61 so that it warps against the primary piezoelectric layer 61.

DETAILED DESCRIPTION OF THE INVENTION

Embodiments of the present invention relate to a microactuator, a head gimbal assembly, and a magnetic disk device, and more particularly to operation of a microactuator employing a piezoelectric element.

A microactuator according to an aspect of embodiments of the present invention comprises a platform for fixing a head slider having magnetic recording and reproducing elements thereon, a substrate for holding and rotating the platform, and a piezoelectric element held on the substrate and expanding or contracting in an in-plane direction of the substrate in response to an applied voltage to move the platform in the in-plane direction; the piezoelectric element is located on the substrate and comprises a primary piezoelectric layer for generating an expansion force in the in-plane direction in response to the applied voltage and a secondary piezoelectric layer laminated on the primary piezoelectric layer opposite from the substrate surface for generating a contraction force in the in-plane direction in response to the applied voltage.

A head gimbal assembly according to another aspect of embodiments of the present invention comprises a head slider having magnetic recording and reproducing elements, a platform for fixing the head slider, a substrate for holding and rotating the platform, a piezoelectric element held on the substrate and expanding or contracting in an in-plane direction of the substrate to move the platform in the in-plane direction, and a suspension for bearing the substrate on its tip end; the piezoelectric element is located on the substrate and comprises a primary piezoelectric layer for generating an expansion force in the in-plane direction in response to the applied voltage and a secondary piezoelectric layer laminated on the primary piezoelectric layer opposite from the substrate surface for generating a contraction force in the in-plane direction in response to the applied voltage.

A magnetic disk device according yet another aspect of embodiments of the present invention comprises a disk, a head slider having elements for recording and reproducing information on the disk, a platform for fixing the head slider, a substrate for holding and rotating the platform, a piezoelectric element held on the substrate and expanding or contracting in an in-plane direction of the substrate in response to an applied voltage to move the platform in the in-plane direction, a moving mechanism bearing the substrate on its tip end for moving the substrate above the disk, and a controller for controlling the piezoelectric element and the moving mechanism to control a position of the head slider above the disk; the piezoelectric element is located on the substrate and comprises a primary piezoelectric layer for generating an expansion force in the in-plane direction in response to the applied voltage and a secondary piezoelectric layer laminated on the primary piezoelectric layer opposite from the substrate surface for generating a contraction force in the in-plane direction in response to the applied voltage.

According to these aspects, when the primary piezoelectric layer of the piezoelectric element expands to move the platform, the secondary piezoelectric layer contracts in a smaller force than the expansion force of the primary piezoelectric layer so that the piezoelectric element warps in the opposite direction from the substrate counterbalancing its tilt toward the substrate. This accomplishes suppression of decrease in the expansion and contraction stroke, and further accomplishes a microactuator, a head gimbal assembly, and a magnetic disk device being capable of highly accurate positioning.

Specifically, they further comprise a first electrode and a second electrode laminated on the primary piezoelectric layer and the secondary piezoelectric layer; a voltage is applied to the primary piezoelectric layer and the secondary piezoelectric layer between the first electrode and the second electrode, and the secondary piezoelectric layer has a polarization direction reversed from the polarization direction in the primary piezoelectric layer in response to the applied voltage, and the electric field for the applied voltage in the secondary piezoelectric layer is smaller than in the primary piezoelectric layer.

In this way, the secondary piezoelectric layer has a reversed polarization direction with respect to and smaller electric field characteristics than the primary piezoelectric layer in the piezoelectric element, which accomplishes smaller contraction of the secondary piezoelectric layer comparing to the expansion of the primary piezoelectric layer.

In addition, in order for the piezoelectric element to have the above-described polarization and electric field characteristics, a threshold voltage for changing a polarization of the primary piezoelectric layer should be smaller than a threshold voltage for changing a polarization of the secondary piezoelectric layer with respect to the applied voltage between the first electrode and the second electrode.

For a specific configuration to achieve different threshold voltages, the primary piezoelectric layer and the secondary piezoelectric layer should be made of the same material, the primary piezoelectric layer should consist of a plurality of piezoelectric layers, each of the first electrode and the second electrode should be a comb electrode, each of the secondary piezoelectric layer and the plurality of piezoelectric layers in the primary piezoelectric layer should be sandwiched between each tooth of the first electrode and each tooth of the second electrode, and a thickness of the secondary piezoelectric layer should be greater than a thickness of one of the plurality of piezoelectric layers in the primary piezoelectric layer.

Where the substrate is a silicon substrate, beams having spring properties may be formed on the silicon substrate, and the beams are displaced in response to expansion or contraction of the piezoelectric element to move the platform.

According to embodiments of the present invention, as counterbalancing a tilt of the piezoelectric element toward the substrate, warping the piezoelectric element in the opposite direction from the substrate leads to approximately 100% of the expansion and contraction stroke of the piezoelectric element, which has been reduced by 40%. As a result, a microactuator, a head gimbal assembly, and a magnetic disk device being capable of accurate positioning may be achieved.

Hereinafter, particular embodiments to which the present invention is applicable will be described. For clarity of explanation, the following description and the accompanying drawings contain omissions and simplifications as appropriate. Throughout the drawings, the like components are denoted by like reference numerals, and their repetitive description is omitted if not necessary. Hereinafter, descriptions will be given to a hard disk drive (HDD) as an example of a disk drive device.

Figure 1:
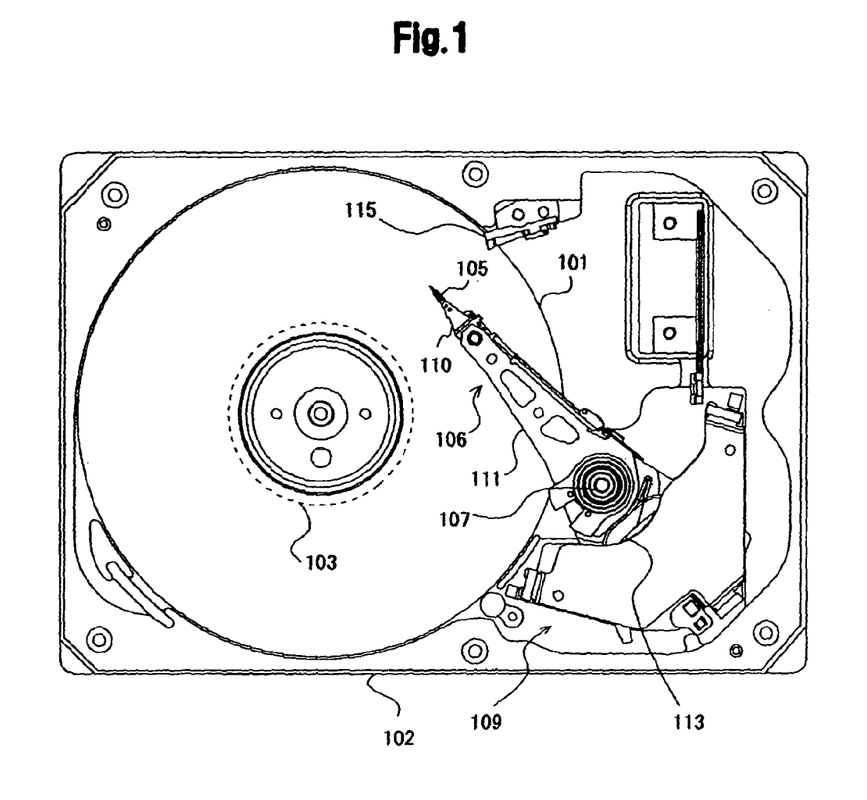
FIG. 1 is an exemplary plan view depicting a HDD according to one embodiment without a cover of an enclosure.

Now referring to FIG. 1, an entire configuration of an HDD will be outlined. Components in the HDD are housed in a base 102; operation of the components in the base 102 is controlled by a control circuit (not shown) on a circuit board fixed to the outside of the base. A HDD comprises a magnetic disk 101 for storing data A head slider 105 comprises a head element portion having magnetic recording and reproducing elements for writing to and/or reading from the magnetic disk 101 and a slider on which the head element portion is formed.

An actuator 106 supports and moves the head slider 105. The actuator 106 is pivotably supported by a pivotal shaft 107 and is driven by a voice coil motor (VCM) 109 as a driving mechanism. The assembly of the actuator 106 and the VCM 109 is a moving mechanism of the head slider 105. Driving of this moving mechanism is controlled by a controller and positioning control of the head slider 105 above the disk is performed. The actuator 106 comprises components of a suspension 110, an arm 111, a coil support, and a VCM coil 113 coupled in order from the tip end where the head slider 105 is disposed. The suspension 110 and the head slider 105 constitute a head gimbal assembly (HGA).

A spindle motor (SPM) 103 fixed to the base 102 spins the magnetic disk 101 at a specific angular rate. To access (read or write) the magnetic disk 101, the actuator 106 moves the head slider 105 over a data area on the surface of the spinning magnetic disk 101. Pressure caused by air viscosity between an air bearing surface (ABS) of the slider facing the magnetic disk 101 and the spinning magnetic disk 101 balances the pressure in the direction toward the magnetic disk 101 applied by the suspension 110 so that the head slider 105 flies above the magnetic disk 101. When the magnetic disk 101 stops spinning, for example, the actuator 106 moves the head slider 105 from above the disk to a ramp 115. Embodiments of the present invention may be applicable to an HDD according to the contact start and stop (CSS) scheme.

Figure 2:
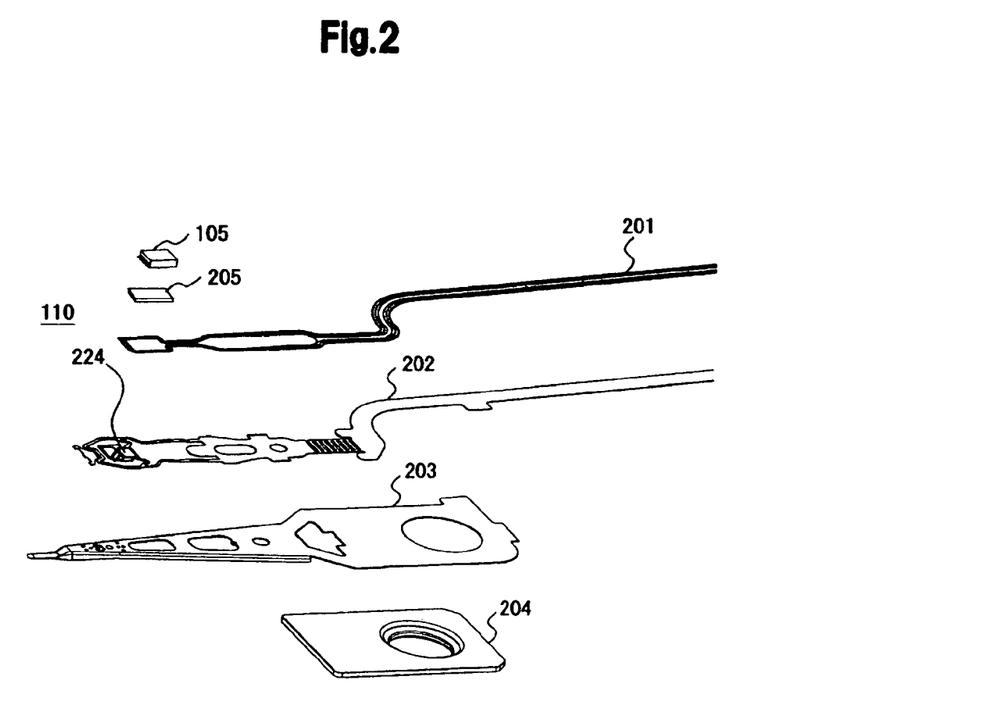
FIG. 2 is an exemplary exploded perspective view illustrating components of an HGA according to one embodiment.

FIG. 2 is an exploded perspective view showing components of the HGA 200. The suspension 110 according to the present embodiment comprises a flexure trace 201, a flexure 202, a load beam 203, a mount plate 204, and a microactuator 205. The load beam 203 is made of stainless steel or the like as a precision leaf spring. Its rigidity is higher than the one of the flexure 202. The spring properties of the load beam 203 cause a load to the head slider 105 which balances the force generated on the ABS of the head slider 105.

The mount plate 204 and the flexure 202 are made of stainless steel, for example. The flexure 202 has a gimbal tongue 224 on which the microactuator 205 and the head slider 105 are fixed. The gimbal tongue 224, which is supported elastically, holds the microactuator 205 and the head slider 105, and contributes to tilt control of the head slider 105 by tilting freely.

Terminals on one end of the flexure trace 201 are connected to the microactuator 205 and the head slider 105, and terminals on the other end are connected to a substrate fixed to the actuator 106. The flex cable 201 flexure trace 201 carries control signals for controlling the microactuator 205 as well as read signals and write signals. The flexure trace 201 is bonded to the flexure 202 by an adhesive. A similar configuration may be formed directly on the flexure 202.

Figure 3:
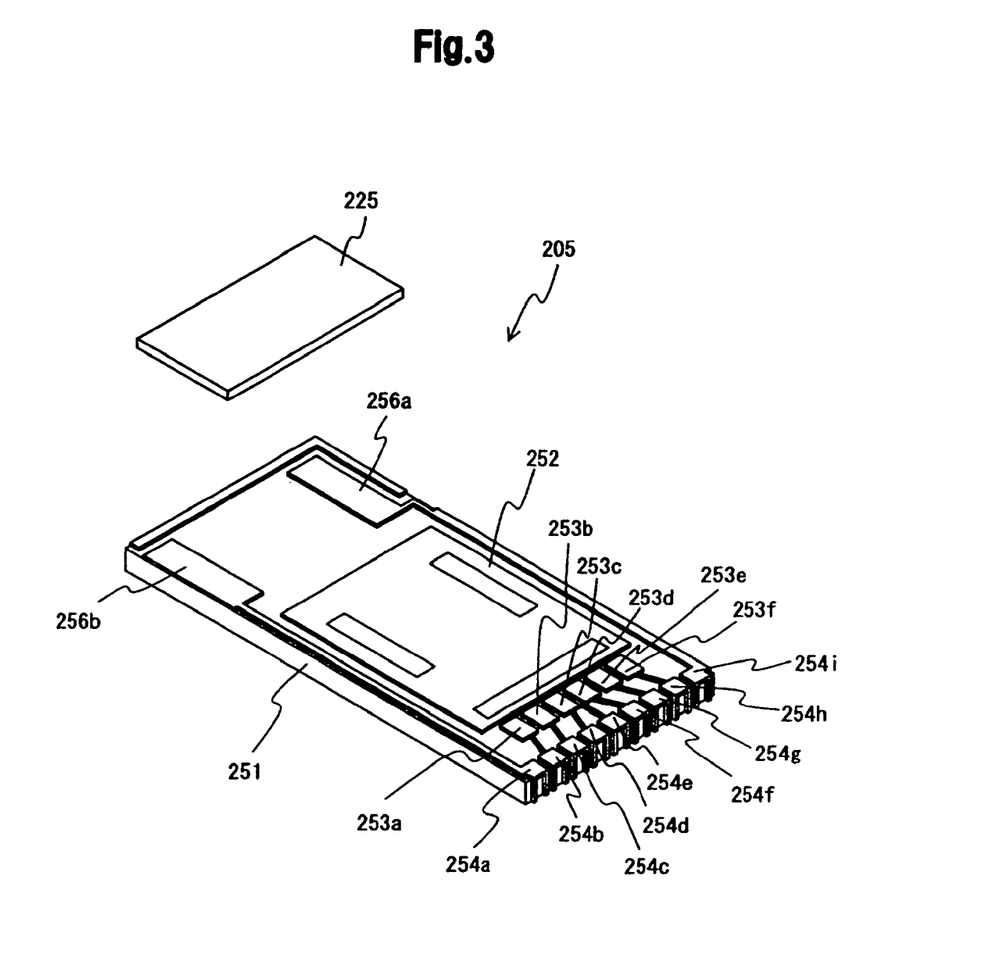
FIG. 3 is an exemplary perspective view schematically illustrating the structure of a microactuator according to one embodiment.

FIG. 3 is a perspective view schematically showing the structure of the microactuator 205 according to one embodiment. The microactuator 205 comprises a silicon substrate 251, a platform 252 for fixing a head slider held on the silicon substrate 251, connection pads 253a to 253f to the head slider 105, connection pads 254a to 254h to the flex cable 201 flexure trace 201, a piezoelectric element 255 held on a substrate, and connection pads 256a and 256b to the piezoelectric element 255. Expansion or contraction of the piezoelectric element 255 in the in-plane direction of the silicon substrate 251 causes the platform 252 to rotate in the in-plane direction of the silicon substrate 251, which results in rotation of the head slider 105 fixed thereon.

Figure 4:
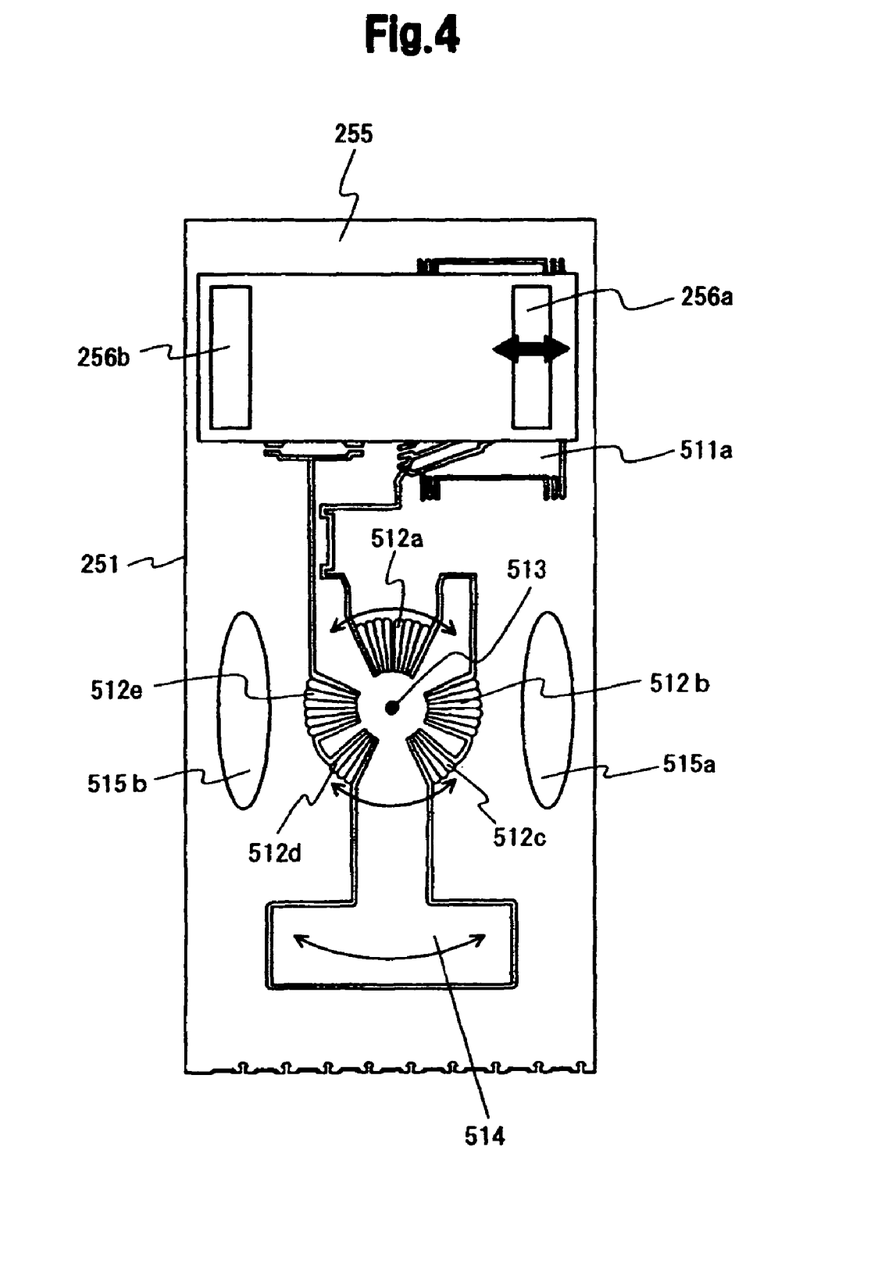
FIG. 4 is an exemplary plan view schematically illustrating the appearance of a bottom surface of a silicon substrate according to one embodiment.

FIG. 4 is a plan view schematically showing the appearance of the silicon substrate 251. The bottom surface of the silicon substrate 251 is a surface to be bonded onto the gimbal tongue 224. The silicon substrate 251 comprises beams formed by etching and having spring properties. In parts 511a, and 512a to 512e where the beams are clustered, the beams are displaced in response to expansion or contraction of the piezoelectric element to exhibit specific movements which will be described later. As a result, the silicon substrate 251 is displaced in response to expansion or contraction of the piezoelectric element 255 so that the head slider 105 rotates. Each arrow in FIG. 4 indicates movements at each of the parts.

Specifically, when the piezoelectric element 255 expands or contracts, the connection pad 256a bonded to the piezoelectric element 255 and its vicinity 511a are displaced. The displacement amount is transferred to 512a to 512e. The 512a to 512e expand or contract in response to the expansion or contraction of the piezoelectric element 255 and rotate about the rotation center 513 as a whole. A rotation stage 514 connected to the 512c and 512d rotates in response to their expansion or contraction. These movements cause rotation of a platform 252 held on the 512a to 512e about a rotation center 513. On the rear surface of the silicon substrate 251, area 515a and 515b, which do not prevent the above displacements, are bonded to the gimbal tongue 224 by an adhesive.

Figure 5:
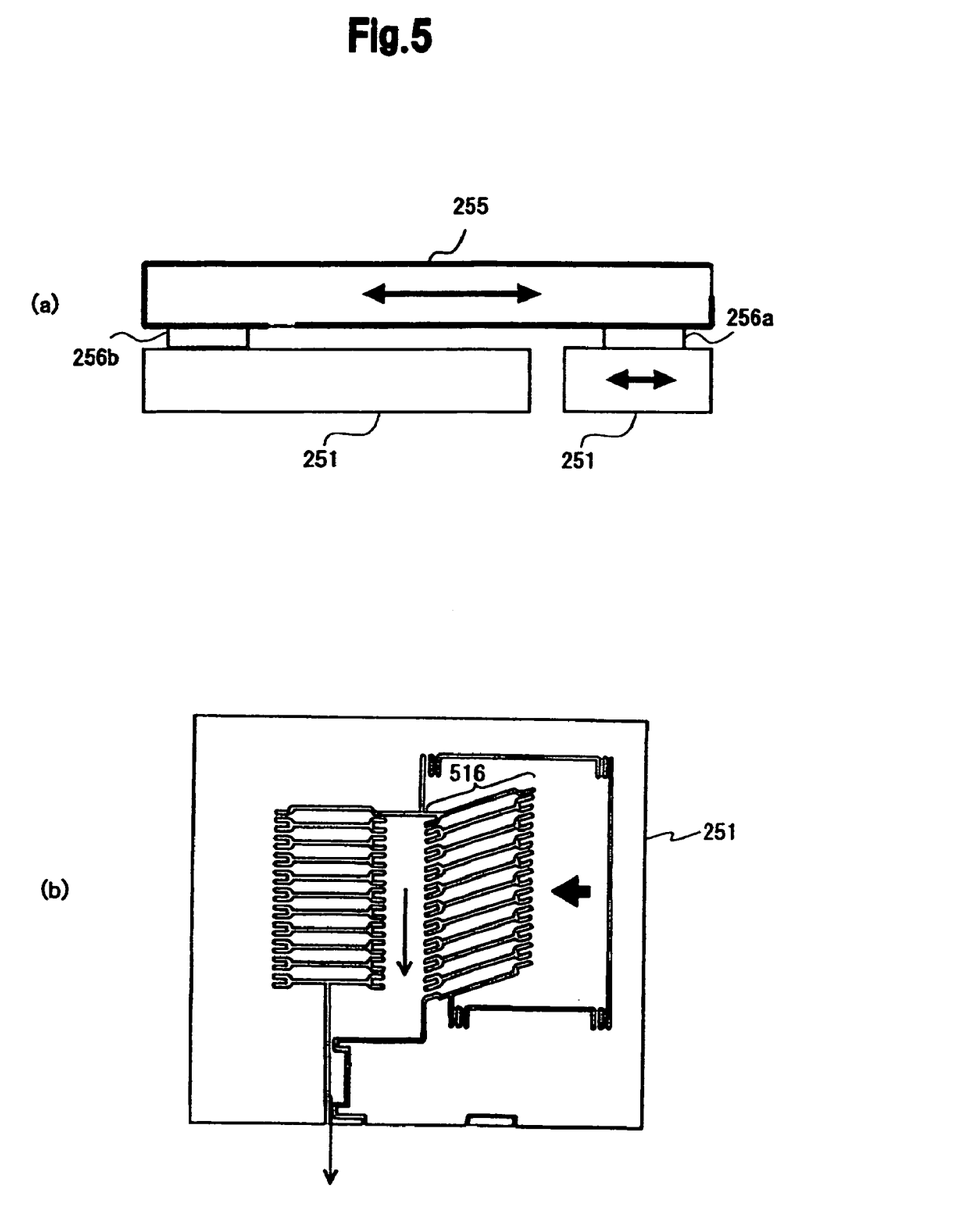
FIGS. 5(a) and 5(b) are exemplary views schematically illustrating cross-sections of a piezoelectric element and the silicon substrate, and the appearance of the silicon substrate in the vicinity of the position where the piezoelectric element is bonded.

FIG. 5(a) schematically shows cross-sections of the piezoelectric element 255 and the silicon substrate 251. FIG. 5(b) shows the appearance of the silicon substrate 251 in the vicinity of the position where the piezoelectric element 255 is fixed. As shown in FIG. 5(a), the piezoelectric element 255 expands and contracts in the in-plane direction of the silicon substrate 251, namely, in the in-plane direction of the surface on which the head slider 105 is held. Specifically, it expands and contracts in the pivoting direction of the actuator 106 or the radial direction of the magnetic disk 101.

In FIG. 5(a), the connection pad 256b is stationary since there is no beam having spring properties of the substrate beneath it. The connection pad 256a is displaced in response to the expansion or contraction of the piezoelectric element 255 since there are beams of the substrate having spring properties beneath it. Therefore, the part indicated by the arrow of 251 is displaced and a stroke amplifier 516 is deformed as shown in FIG. 5(b). The stroke amplifier 516 consists of multiple oblique bars. The deformation of the stroke amplifier 516 is transferred to the 512a to 512e. Typically, a specific bias voltage is applied to the piezoelectric element 255 and the application of the voltage is increased or decreased referring to the voltage. This allows the held head slider 105 to pivot in both directions. A controller controls driving of the piezoelectric element to achieve the controlled positioning of the head slider above the disk.

The piezoelectric element 255 is held on the silicon substrate 251. The silicon substrate 251 has some rigidity and reactive force to the elastic deformations of movable parts of the silicon substrate 251 is applied to the piezoelectric element 255. Therefore, in expanding operation of the piezoelectric element 255, the piezoelectric element 255 may bend toward the silicon substrate 251 so that the stroke in the in-plane direction of the silicon substrate 251 may decrease.

Figure 6:
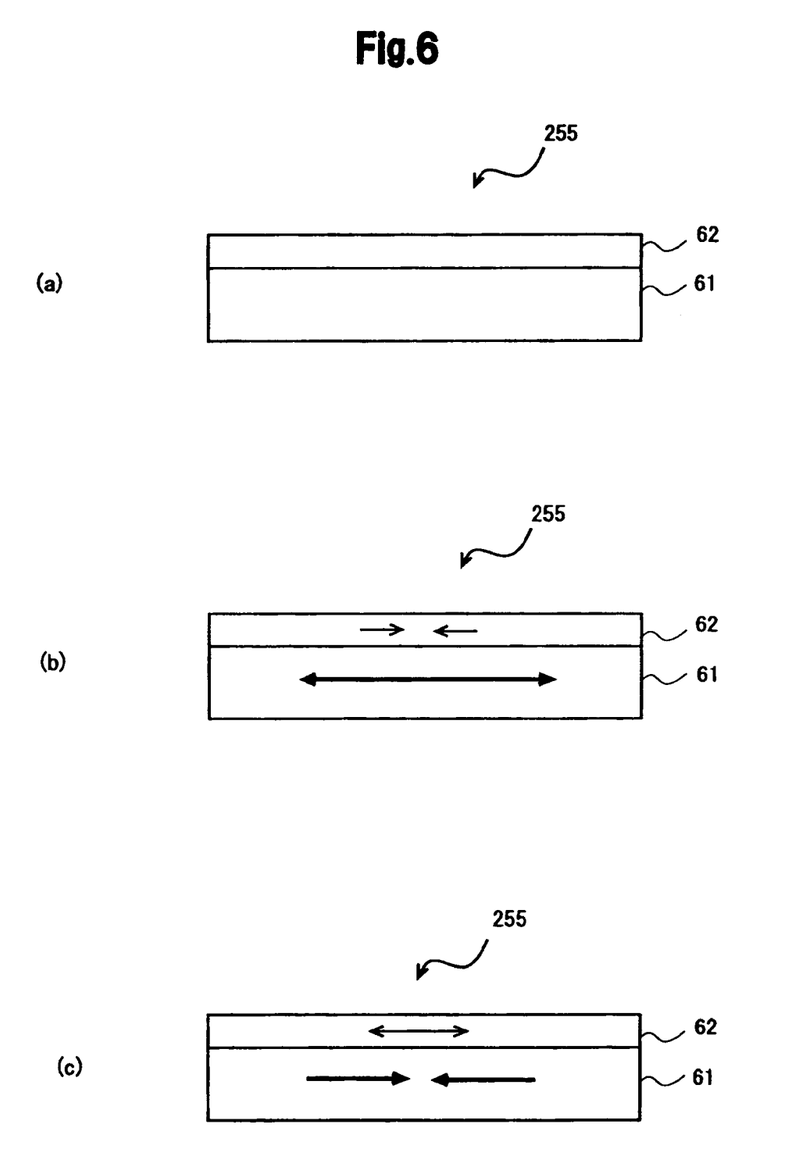
FIGS. 6(a)-6(c) are exemplary cross-sectional views schematically illustrating the structure and operations of the piezoelectric element according to one embodiment.

The piezoelectric element 255 according to one embodiment is configured by laminating piezoelectric layers having different polarities. Specifically, as shown in FIG. 6(a), the piezoelectric element 255 consists of a lower primary piezoelectric layer 61 and an upper secondary piezoelectric layer 62. The primary piezoelectric layer 61 is held on the silicon substrate 251. The secondary piezoelectric layer 62 is laminated on the primary piezoelectric layer 61 opposite from the silicon substrate 251. The primary piezoelectric layer 61 is located between the secondary piezoelectric layer 62 and the silicon substrate 251.

When a driving voltage is applied to the piezoelectric element 255, the primary piezoelectric layer 61 and the secondary piezoelectric layer 62 generate opposite expansion and contraction forces from each other. Therefore, as shown in FIG. 6(b), when the primary piezoelectric layer 61 attempts to expand, the secondary piezoelectric layer 62 attempts to contract. On the contrary, as shown in FIG. 6(c), when the primary piezoelectric layer 61 attempts to contract, the secondary piezoelectric layer 62 attempts to expand.

Figure 7:
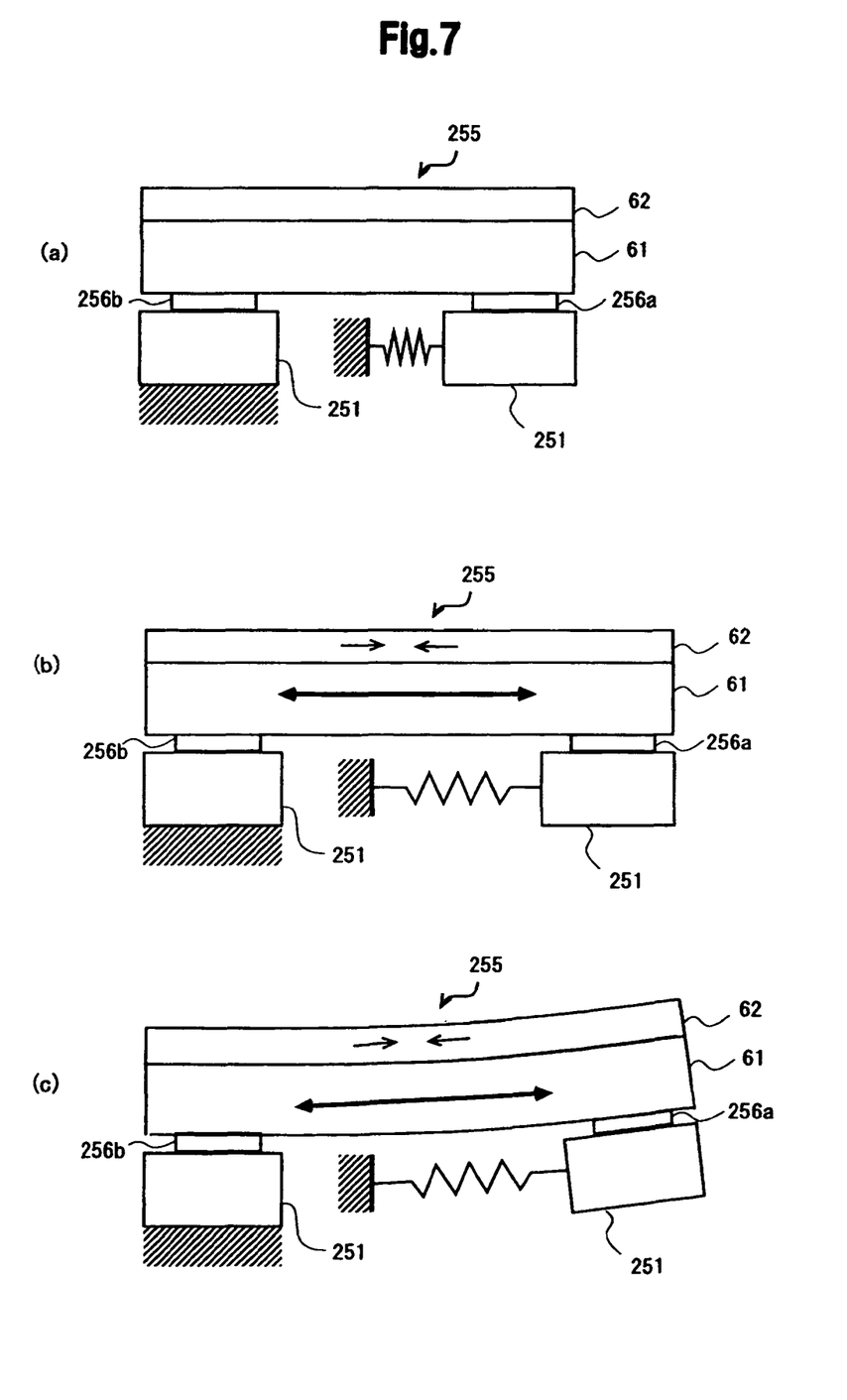
FIGS. 7(a)-7(c) are exemplary cross-sectional views schematically illustrating changes in shapes of the piezoelectric element and the silicon substrate according to one embodiment.

FIG. 7(a) is a cross-sectional view schematically showing the piezoelectric element 255 and the silicon substrate 251 in a normal state. FIG. 7(b) schematically shows the piezoelectric element 255 and the silicon substrate 251 when the piezoelectric element 255 in the state of FIG. 7(a) has expanded. The connection pad 256b for the piezoelectric element 255 and the silicon substrate 251 is fixed and does not substantially move. On the other hand, the connection pad 256a is displaced in response to the expansion force of the piezoelectric element 255 so that the vicinity of the connection pad 256a on the silicon substrate 251 is displaced.

The silicon substrate 251 has some rigidity to provide the connection pad 256a and the piezoelectric element 255 with elastic counter force. If the piezoelectric element is configured by only the primary piezoelectric layer 61, the piezoelectric element slightly bends toward the silicon substrate 251 due to the elastic force of the silicon substrate 251 as described referring to FIG. 11. With regard to the piezoelectric element 255 according to the present embodiment, the secondary piezoelectric layer 62 is laminated on the primary piezoelectric layer 61 opposite from the silicon substrate 251.

The secondary piezoelectric layer 62 provides the primary piezoelectric layer 61 with counter force to the elastic counter force of the silicon substrate 251. That is to say, when the primary piezoelectric layer 61 expands, the elastic counter force of the silicon substrate 251 acts on the primary piezoelectric layer 61 so that it bends toward the silicon substrate 251. Counteracting this, contraction force of the secondary piezoelectric layer 62 acts on the primary piezoelectric layer 61 so that it bends toward the secondary piezoelectric layer 62 which is opposite from the silicon substrate 251.

Since the contraction force of the secondary piezoelectric layer 62 balances the elastic counter force of the silicon substrate 251 as in the above-described manner, the piezoelectric element 255 of an embodiment may expand straight in the substantially parallel direction to the surface of the silicon substrate 251 as shown in FIG. 7(b). In this way, the secondary piezoelectric layer 62 prevents the piezoelectric element 255 from tilting toward the silicon substrate 251 and suppresses the decrease in the in-plane stroke of the piezoelectric element 255 and the displacement amount of the silicon substrate 251. Consequently, the displacement amount of the head slider 105 at the same applied voltage may be increased. According to experimental results, the expansion and contraction stroke of the piezoelectric element which decreased by 40% may be recovered to approximately 100%.

In the state of FIG. 7(b), the contraction force of the secondary piezoelectric layer balances the elastic counter force of the silicon substrate so that the piezoelectric element 255 expands substantially parallel to the surface of the silicon substrate 251. Or, as shown in FIG. 7(c), the piezoelectric element 255 and the silicon substrate 251 may be designed so that the piezoelectric element 255 bends toward the secondary piezoelectric layer 62 in its expansion by strengthening the contraction force of the secondary piezoelectric layer more than the elastic counter force of the silicon substrate. In this state, the displacement amount of the piezoelectric element and the silicon substrate is larger than in the state of FIG. 7(b). Consequently, the displacement amount of the head slider in the application of the same voltage may increase. Even in the case that the piezoelectric element 255 tilts toward the silicon substrate 251 in its expansion, if the tilt amount is reduced by the secondary piezoelectric layer 62, decrease in the displacement amount of the head slider 105 may be reduced.

Figure 8:
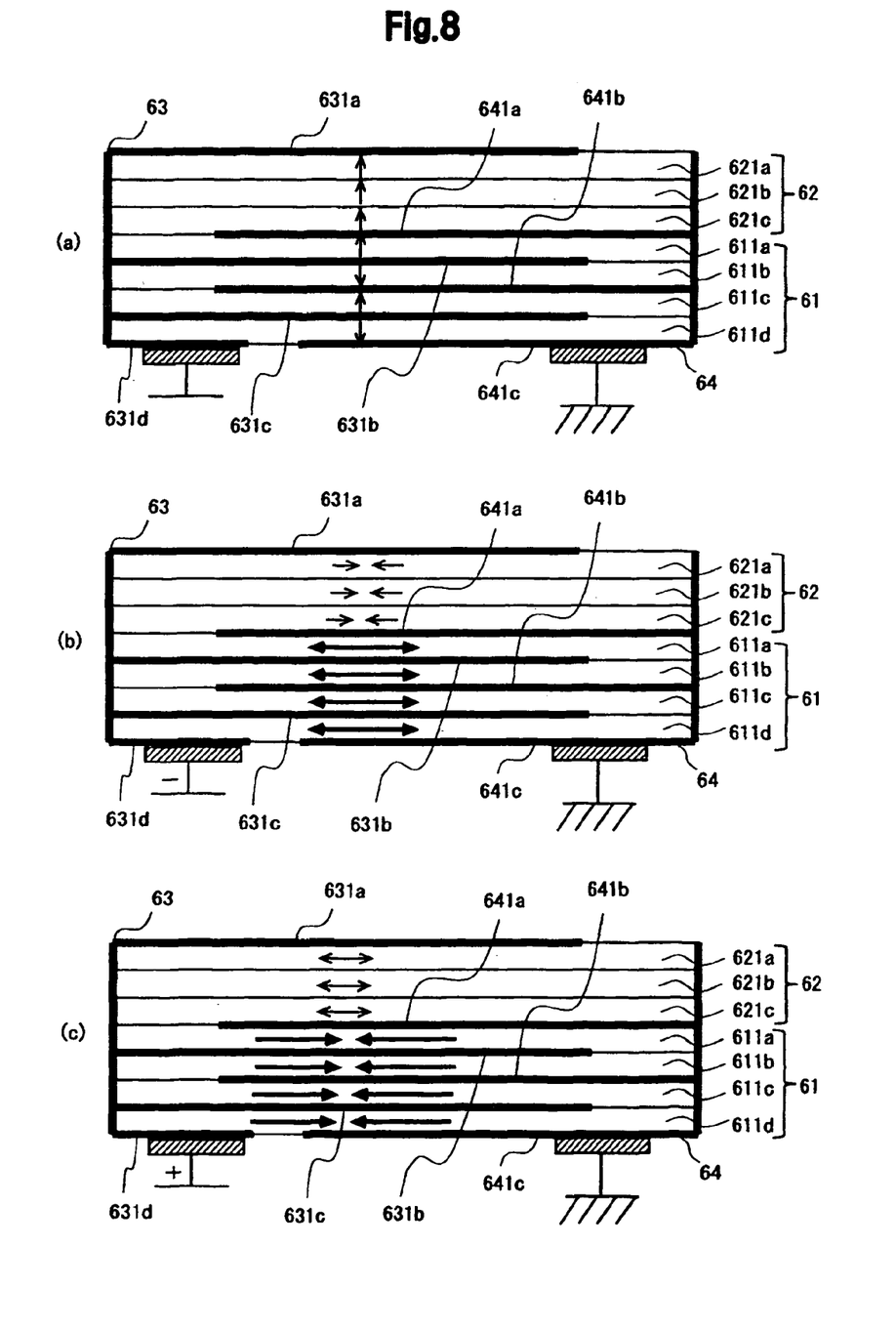
FIGS. 8(a)-8(c) are exemplary cross-sectional views schematically illustrating the structure of the piezoelectric element.

Hereinafter, the structure of the piezoelectric element 255 according to one embodiment will be described in more detail. FIG. 8(a) is a cross-sectional view schematically illustrating a preferred example of a structure of the piezoelectric element 255. The piezoelectric element 255 comprises a primary piezoelectric layer 61, a secondary piezoelectric layer 62 laminated on the primary piezoelectric layer 61, a first electrode 63, and a second electrode 64. A voltage for driving the piezoelectric layers is applied across the first electrode and the second electrode.

The primary piezoelectric layer 61 and the secondary piezoelectric layer 62 of the present example each consist of a plurality of laminated piezoelectric layers. Specifically, the primary piezoelectric layer 61 has four piezoelectric layers 611a to 611d and the secondary piezoelectric layer 62 has three piezoelectric layers 621a to 621c. The arrows shown in the piezoelectric layers each indicate polarization of the piezoelectric layers. When a voltage is applied to a piezoelectric layer in its polarizing direction, the piezoelectric layer expands in parallel to the direction (in the laminating direction). On the other hand, when a voltage is applied in the reverse direction to the polarization, the piezoelectric layer contracts in parallel to the direction (in the laminating direction). When the piezoelectric element 255 expands in the laminating direction, it contracts in the in-plane direction orthogonal thereto; and when it contracts in the laminating direction, it expands in the in-plane direction.

The first electrode 63 and the second electrode 64 of the present example are comb electrodes. The first electrode 63 has four tooth electrodes 631a to 631d and the second electrode 64 has three tooth electrodes 641a to 641c. For example, the second electrode 64 is maintained at a reference potential like a ground and the potential applied to the first electrode 63 varies to control the expansion and contraction of the piezoelectric element 255. The tooth electrodes 631a to 631d of the first electrode 63 and the tooth electrodes 641a to 641c of the second electrode 64 are disposed alternately in the laminating direction.

Each of the piezoelectric layers 611a to 611d constituting the primary piezoelectric layer 61 is sandwiched between each of the tooth electrodes 631b and 631c of the first electrode and each of the tooth electrodes 641a to 641c of the second electrode. The secondary piezoelectric layer 62 as a whole is sandwiched between the tooth electrode 631a of the first electrode and the tooth electrode 641a of the second electrode. Namely, there is no electrode among the piezoelectric layers of the secondary piezoelectric layer 62. Accordingly, the thickness between the tooth electrodes in the secondary piezoelectric layer 62 is greater than the thickness between the tooth electrodes in the primary piezoelectric layer 61. In the example of FIG. 8(a), the thickness between the tooth electrodes in the secondary piezoelectric layer 62 is three times greater than the thickness between the tooth electrodes in the primary piezoelectric layer 61.

As shown in FIG. 8(b), it is assumed that a reference potential is applied to the second electrode 64 and a negative potential with respect to the reference potential is applied to the first electrode 63. In response, the primary piezoelectric layer contracts in the laminating direction and expands in the in-plane direction. On the contrary, the secondary piezoelectric layer expands in the laminating direction and contracts in the in-plane direction. Instead, it is assumed that a positive potential is applied to the first electrode 63 with respect to the reference potential at the second electrode 64 as shown in FIG. 8(c). In response to this, the primary piezoelectric layer expands in the laminating direction and contracts in the in-plane direction, and the secondary piezoelectric layer contracts in the laminating direction and expands in the in-plane direction.

If the piezoelectric layers are made of the same material, the expansion and contraction force is proportional to the applied electric field strength (V/m). If the voltages applied across the electrodes of the piezoelectric layers are the same, the electric field becomes stronger as the thickness between the electrodes of the piezoelectric layers becomes smaller. Accordingly, if the primary piezoelectric layer 61 and the secondary piezoelectric layer 62 are made of the same material, the electric field in the secondary piezoelectric layer 62 is weaker than that in the primary piezoelectric layer 62.

Consequently, the expansion and contraction of the whole piezoelectric element corresponds to the expansion and contraction of the primary piezoelectric layer. If the primary piezoelectric layer expands, the secondary piezoelectric layer contracts with smaller force than the expansion force of the primary piezoelectric layer.

Such operations bring the contraction force of the secondary piezoelectric layer counteracting the elastic counter force of the silicon substrate shown in FIG. 7(b) or FIG. 7(c). The contraction force of the secondary piezoelectric layer varies depending on the thickness between the electrodes. Therefore, it is necessary to take into account of the relationship with the rigidity of the silicon substrate 251 in designing the thickness. Basically, the thickness between the comb-tooth electrodes for the secondary piezoelectric layer 62 should be made greater than the thickness between the comb-tooth electrodes for the primary piezoelectric layer 61 so that the expansion and contraction force of the secondary piezoelectric layer is made smaller than the expansion and contraction force of the primary piezoelectric layer.

From the view points of simplicity in the structure and easiness in manufacture, the primary piezoelectric layer 61 and the secondary piezoelectric layer 62 are preferably made of the same material, but may be made of different materials. If the piezoelectric layers are made of different materials, the expansion and contraction amounts (expansion and contraction force) responsive to the voltage become different values so that it is important to design the thickness of each piezoelectric layer to suit the material. Similarly, from the view points of simplicity in the structure and easiness in manufacture, all of the piezoelectric layers 611a to 611d and 621a to 621c preferably have the same thickness, but may have different thicknesses. Or, piezoelectric layers of different materials or different thicknesses may be used in the primary piezoelectric layer 61 or in the secondary piezoelectric layer 62.

Figure 9:
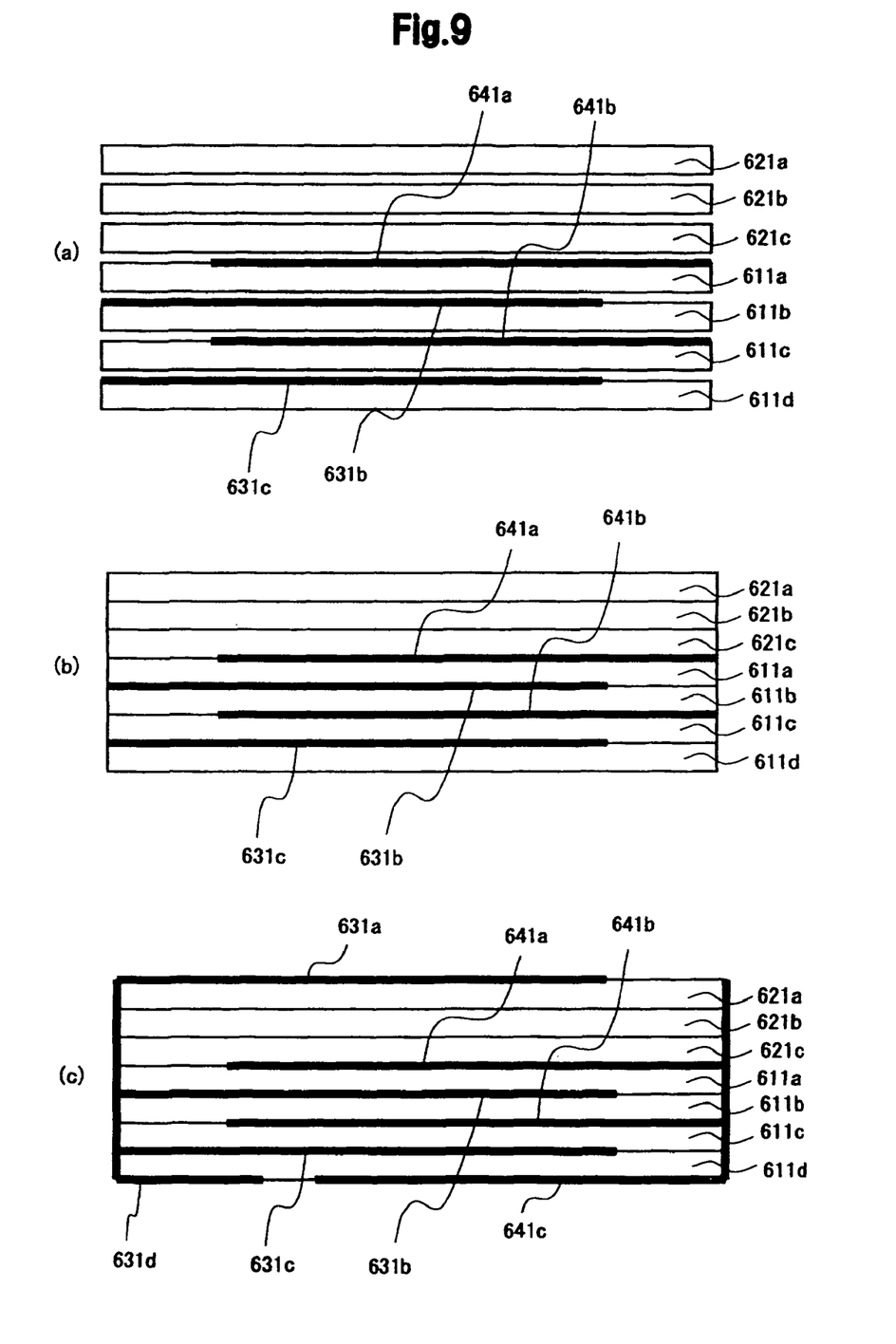
FIGS. 9(a)-9(c) are exemplary cross-sectional views schematically illustrating a part of the steps in a manufacturing method of the piezoelectric element according to one embodiment.

Hereinafter, a preferable method for manufacturing the piezoelectric element 255 will be explained referring to FIG. 9. In the following preferable example, the primary piezoelectric layer 61 and the secondary piezoelectric layer 62 are made of the same material. The piezoelectric layers 611a to 611d and 621a to 621c constituting the primary piezoelectric layer 61 and the secondary piezoelectric layer 62 respectively have the same thickness. These achieve reduction in the number of components and effective manufacturing.

In an example of actual manufacturing, electrode formation, lamination, and cutting are performed onto piezoelectric layers which are originally rectangle with the size of several ten millimeters per side to form a single piezoelectric element of laminated piezoelectric layers each being 1.35 mm in width, 0.5 mm in length, and 0.012 mm in thickness. Now referring to FIG. 9, the manufacturing steps will be described focusing attention on the cross-section of the piezoelectric element for convenience.

First, as shown in FIG. 9(a) piezoelectric layers 611a to 611d and 621a to 621c before burning process are prepared. Metallic layers to be the tooth electrodes 631b, 631c, 641a, and 641b are printed on the piezoelectric layers 611a to 611d. Next, as shown in FIG. 9(b), the piezoelectric layers 611a to 611d and 621a to 621c are laminated, and then the piezoelectric layers 611a to 611d and 621a to 621c are burned. After the burning, attaching the metallic layers onto the surrounding of the laminated product, the comb-like first and second electrodes 63 and 64 are formed as shown in FIG. 9(c). Finally, the piezoelectric element 255 with piezoelectric layers which have not been polarized is obtained.

Next, a polarization is performed for each piezoelectric layer of the piezoelectric element 255. To cause a polarization in the piezoelectric layer, it is necessary to apply a voltage exceeding a specific threshold to the piezoelectric layer. In one example, the voltage exceeding the specific threshold is set to 30 V.

Between each of the piezoelectric layers of the primary piezoelectric layer 61, there exists a tooth electrode; the piezoelectric layers of the secondary piezoelectric layer 62 are laminated layer by layer and there is no tooth electrode among them and the whole piezoelectric layers are sandwiched between tooth electrodes. Therefore, the thickness between the electrodes in the secondary piezoelectric layer is greater than the one in the primary piezoelectric layer. Since the both piezoelectric layers are made of the same material, if the same voltage is applied to the electrodes of the primary piezoelectric layer and the secondary piezoelectric layer, the voltage received by each of the piezoelectric layers 621a to 621c in the secondary piezoelectric layer 62 becomes one-third of the voltage received by each of the piezoelectric layers 611a to 611d in the primary piezoelectric layer 61.

Figure 10:
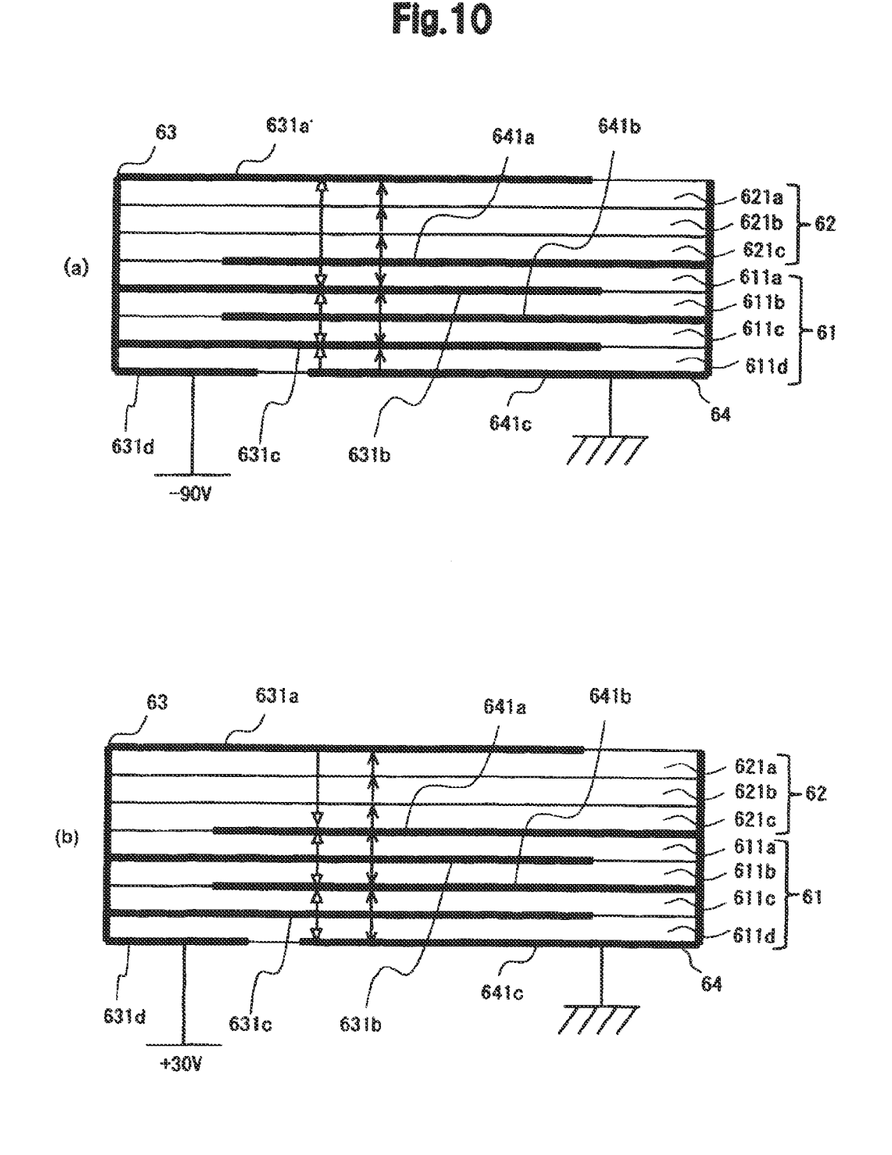
FIGS. 10(a) and 10(b) are exemplary cross-sectional views schematically illustrating a polarization method for the piezoelectric element according to one embodiment.

Taking the above matters into consideration, polarizations are performed. First, as shown in FIG. 10(a), a ground potential is applied to the second electrode and −90 V is applied to the first electrode. This results in that each of the layers 611a to 611d in the primary piezoelectric layer 61 receives 90 V and each of the layers 621a to 621c in the secondary piezoelectric layer 62 receives 30 V so that the both layers are polarized in the direction from the second electrode 64 to the first electrode 63. Then, a ground potential is applied to the second electrode 64 and +30 V is applied to the first electrode 63 as shown in FIG. 10(b). This results in that each of the layers 611a to 611d of the primary piezoelectric layer 61 receives 30 V but each of the layers 621a to 621c of the secondary piezoelectric layer 62 receives only 10 V so that the polarization is reversed in the primary piezoelectric layer only while the polarization is maintained in the secondary piezoelectric layer 62. As a result, the direction in the polarization of the secondary piezoelectric layer 62 in response to the applied voltage is reversed from the one of the primary piezoelectric layer 61.

According to the above-described polarizations, the piezoelectric element 255 in FIG. 8(a) may be obtained. In the description of the above manufacturing method, the dimensions of the piezoelectric layers and the applied voltages in the polarizations are by way of example only and the values should be selected so as to be optimum according to the actual design.

As set forth above, the present invention has been described by way of particular embodiments but is not limited to the above embodiments. A person skilled in the art may easily modify, add, and convert each element in the above embodiments within the scope of the present invention. For example, embodiments of the present invention are particularly useful to an HDD but may be applied to another type of disk drive device. The piezoelectric element according to embodiments of the present invention may have an additional piezoelectric layer as well as the primary piezoelectric layer and the secondary piezoelectric layer.

The primary piezoelectric layer and the secondary piezoelectric layer have preferably a laminated structure, but may have a single-layer structure. The control voltage for the primary piezoelectric layer and the secondary piezoelectric layer is preferably applied between the same electrodes, but different electrodes may be formed for each of them to apply the control voltage. The microactuator preferably comprises a silicon substrate but it may be omitted if the tongue has the same functions. Or, the piezoelectric element may be disposed on a different surface from the silicon substrate in a possible design.

What is claimed is:

1. A microactuator comprising:
    a platform for fixing a head slider having magnetic recording and reproducing elements thereon;
    a substrate for holding and rotating the platform;
    a piezoelectric element held on the substrate and expanding or contracting in an in-plane direction of the substrate in response to an applied voltage to move the platform in the in-plane direction, located on the substrate and comprising a primary piezoelectric layer for generating an expansion force in the in-plane direction in response to the applied voltage and a secondary piezoelectric layer laminated on the primary piezoelectric layer opposite from the substrate surface for generating a contraction force in the in-plane direction in response to the applied voltage; and a first electrode and a second electrode laminated on the primary piezoelectric layer and the secondary piezoelectric layer, wherein
    a voltage is applied to the primary piezoelectric layer and the secondary piezoelectric layer between the first electrode and the second electrode; and
    the secondary piezoelectric layer has a polarization direction reversed from the polarization direction in the primary piezoelectric layer in response to the applied voltage, and the electric field for the applied voltage in the secondary piezoelectric layer is smaller than in the primary piezoelectric layer.

2. The microactuator according to claim 1, wherein a threshold voltage for changing a polarization of the primary piezoelectric layer is smaller than a threshold voltage for changing a polarization of the secondary piezoelectric layer with respect to the applied voltage between the first electrode and the second electrode.

3. The microactuator according to claim 1, wherein
    the primary piezoelectric layer and the secondary piezoelectric-layer are made of the same material;
    the primary piezoelectric layer consists of a plurality of piezoelectric layers;
    each of the first electrode and the second electrode is a comb electrode; each of the secondary piezoelectric layer and the plurality of piezoelectric layers in the primary piezoelectric layer is sandwiched between each tooth of the first electrode and each tooth of the second electrode; and
    a thickness of the secondary piezoelectric layer is greater than a thickness of one of the plurality of piezoelectric layers in the primary piezoelectric layer.

4. The microactuator according to claim 1, wherein
    the substrate is a silicon substrate;
    beams having spring properties are formed on the silicon substrate; and
    the beams are displaced in response to expansion or contraction of the piezoelectric element to move the platform.

5. A head gimbal assembly comprising:
    a head slider having magnetic recording and reproducing elements;
    a platform for fixing the head slider;
    a substrate for holding and rotating the platform;
    a piezoelectric element held on the substrate and expanding or contracting in an in-plane direction of the substrate to move the platform in the in-plane direction;
    a suspension for bearing the substrate on its tip end; wherein
    the piezoelectric element is located on the substrate and comprises a primary piezoelectric layer for generating an expansion force in the in-plane direction in response to the applied voltage and a secondary piezoelectric layer laminated on the primary piezoelectric layer opposite from the substrate surface for generating a contraction force in the in-plane direction in response to the applied voltage;
    a first electrode and a second electrode laminated on the primary piezoelectric layer and the secondary piezoelectric layer; wherein
    a voltage is applied to the primary piezoelectric layer and the secondary piezoelectric layer between the first electrode and the second electrode; and
    the secondary piezoelectric layer has a polarization direction reversed from the polarization direction in the primary piezoelectric layer in response to the applied voltage, and the electric field for the applied voltage in the secondary piezoelectric layer is smaller than in the primary piezoelectric layer.

6. The head gimbal assembly according to claim 5, wherein a threshold voltage for changing a polarization of the primary piezoelectric layer is smaller than a threshold voltage for changing a polarization of the secondary piezoelectric layer with respect to the applied voltage between the first electrode and the second electrode.

7. The head gimbal assembly according to claim 5, wherein
the primary piezoelectric layer and the secondary piezoelectric layer are made of the same material;
the primary piezoelectric layer consists of a plurality of piezoelectric layers;
each of the first electrode and the second electrodes is a comb electrode;
each of the secondary piezoelectric layer and the plurality of piezoelectric layers in the primary piezoelectric layer is sandwiched between each tooth of the first electrode and each tooth of the second electrode; and
a thickness of the secondary piezoelectric layer is greater than a thickness of one of the plurality of piezoelectric layers in the primary piezoelectric layer.

8. The head gimbal assembly according to claim 5, wherein
the substrate is a silicon substrate;
beams having spring properties are formed on the silicon substrate; and
the beams are displaced in response to expansion or contraction of the piezoelectric element to move the platform.

9. A magnetic disk device comprising:
a disk; a head slider having elements for recording and reproducing information on the disk;
a platform for fixing the head slider;
a substrate for holding and rotating the platform;
a piezoelectric element held on the substrate and expanding or contracting in an in-plane direction of the substrate in response to an applied voltage to move the platform in the in-plane direction;
a moving mechanism bearing the substrate on its tip end for moving the substrate above the disk;
a controller for controlling the piezoelectric element and the moving mechanism to control a position of the head slider above the disk; wherein
the piezoelectric element is located on the substrate and comprises a primary piezoelectric layer for generating an expansion force in the in-plane direction in response to the applied voltage and a secondary piezoelectric layer laminated on the primary piezoelectric layer opposite from the substrate surface for generating a contraction force in the in-plane direction in response to the applied voltage;
a first electrode and a second electrode laminated on the primary piezoelectric layer and the secondary piezoelectric layer, wherein
a voltage is applied to the primary piezoelectric layer and the secondary piezoelectric layer between the first electrode and the second electrode; and
the secondary piezoelectric layer has a polarization direction reversed from the polarization direction in the primary piezoelectric layer in response to the applied voltage, and the electric field for the applied voltage in the secondary piezoelectric layer is smaller than in the primary piezoelectric layer.

10. The magnetic disk device according to claim 9, wherein a threshold voltage for changing a polarization of the primary piezoelectric layer is smaller than a threshold voltage for changing a polarization of the secondary piezoelectric layer with respect to the applied voltage between the first electrode and the second electrode.

11. The magnetic disk device according to claim 9, wherein
the primary piezoelectric layer and the secondary piezoelectric layer are made of the same material;
the primary piezoelectric layer consists of a plurality of piezoelectric layers;
each of the first electrode and the second electrode is a comb electrode;
each of the secondary piezoelectric layer and the plurality of piezoelectric layers in the primary piezoelectric layer is sandwiched between each tooth of the first electrode and each tooth of the second electrode; and
a thickness of the secondary piezoelectric layer is greater than a thickness of one of the plurality of piezoelectric layers in the primary piezoelectric layer.

12. The magnetic disk device according to claim 9, wherein
the substrate is a silicon substrate;
beams having spring properties are formed on the silicon substrate;
the beams are displaced in response to expansion or contraction of the piezoelectric element to move the platform.

* * * * *